(12) United States Patent
Zakharchenko et al.

(10) Patent No.: US 12,175,715 B2
(45) Date of Patent: Dec. 24, 2024

(54) HYBRID GEOMETRIC CODING OF POINT CLOUDS

(71) Applicant: Huawei Technologies Co., Ltd., Shenzhen (CN)

(72) Inventors: Vladyslav Zakharchenko, Sunnyvale, CA (US); Birendra Kathariya, Roeland Park, KS (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 822 days.

(21) Appl. No.: 17/127,329

(22) Filed: Dec. 18, 2020

(65) Prior Publication Data

US 2021/0104077 A1 Apr. 8, 2021

Related U.S. Application Data

(63) Continuation of application No. PCT/US2019/039031, filed on Jun. 25, 2019.
(Continued)

(51) Int. Cl.
*G06T 9/40* (2006.01)
*H04N 19/184* (2014.01)

(52) U.S. Cl.
CPC .............. *G06T 9/40* (2013.01); *H04N 19/184* (2014.11)

(58) Field of Classification Search
CPC ......... G06T 9/40; G06T 9/001; G06T 17/005; G06T 2210/56; G06T 2207/10028;
(Continued)

(56) References Cited

U.S. PATENT DOCUMENTS

| 4,694,404 A | 9/1987 | Meagher |
| 7,002,571 B2 | 2/2006 | Lake et al. |

(Continued)

FOREIGN PATENT DOCUMENTS

| CA | 2413056 A1 | 5/2003 |
| CN | 1684109 A | 10/2005 |

(Continued)

OTHER PUBLICATIONS

Kathariya et al. "Scalable Point Cloud Geometry Coding With Binary Tree Embedded Quadtree", 2018 IEEE International Conference on Multimedia and Expo (ICME), Jul. 23-27, 2018 (Year: 2018).*

(Continued)

*Primary Examiner* — Qian Yang
(74) *Attorney, Agent, or Firm* — Conley Rose, P.C.

(57) ABSTRACT

An apparatus comprises a processor configured to obtain a point cloud, make a choice between octree encoding or quadtree encoding of a parent node, and encode the parent node into a bitstream based on the choice; and a transmitter coupled to the processor and configured to transmit the bitstream. An apparatus comprises a receiver configured to receive a bitstream; and a processor coupled to the receiver and configured to parse from the bitstream a first parameter indicating a depth of PCC, decode first nodes before the depth using octree decoding, parse from the bitstream a second parameter indicating a node coding mode for second nodes at and after the depth, and decode the second nodes based on the second parameter.

27 Claims, 7 Drawing Sheets

Related U.S. Application Data

(60) Provisional application No. 62/689,666, filed on Jun. 25, 2018.

(58) Field of Classification Search
CPC .. H04N 19/184; H04N 19/119; H04N 19/176; H04N 19/46; H04N 19/96
See application file for complete search history.

(56) References Cited

U.S. PATENT DOCUMENTS

| | | | |
|---|---|---|---|
| 8,169,434 B2 | 5/2012 | Zhou et al. | |
| 2005/0180340 A1* | 8/2005 | Lee | H04N 19/90 370/258 |
| 2012/0176381 A1 | 7/2012 | Park et al. | |
| 2014/0376827 A1 | 12/2014 | Jiang et al. | |
| 2015/0264372 A1* | 9/2015 | Kolesnikov | H04N 19/52 375/240.16 |
| 2019/0139266 A1* | 5/2019 | Budagavi | G06T 9/001 |

FOREIGN PATENT DOCUMENTS

| | | |
|---|---|---|
| CN | 103918009 A | 7/2014 |
| CN | 107993279 A | 5/2018 |
| EP | 0152741 A2 | 8/1985 |
| JP | 2005259139 A | 9/2005 |
| WO | 2014000160 A1 | 1/2014 |
| WO | WO 2015/158870 * | 10/2015 |

OTHER PUBLICATIONS

Kathariya, B., et al., "PCC CE3.1 BTQT—Binary Tree Embedded Quadtree for Point Cloud Compression," International Organisation for Standardisation Organisation Internationale De Normalisation ISO/IEC JTC1/SC29/WG11, Coding of Moving Pictures and Audio, ISO/IEC JTC1/SC29/WG11 MPEG2017/m41622, Oct. 2017, Gwangju, South Korea, 8 pages.

Ainala, K., "Point Cloud Compression and Low Latency Streaming," A Thesis In Electrical Engineering Presented to the Faculty of the University of Missouri-Kansas City in partial fulfillment of the requirements for the degree Master of Science, 2017, 37 pages.

"Series H: Audiovisual and Multimedia Systems Infrastructure of audiovisual services—Transmission multiplexing and synchronization; Multiplexing protocol for low bit rate multimedia communication," ITU-T Recommendation H.223, Jul. 2001, 74 pages.

"Series H: Audiovisual and Multimedia Systems Infrastructure of audiovisual services—Coding of moving video; Video coding for low bit rate communication," ITU-T Recommendation H.263, Jan. 2005, 226 pages.

"Series H: Audiovisual and Multimedia Systems Infrastructure of audiovisual services—Coding of moving video; Advanced video coding for generic audiovisual services," Recommendation ITU-T H.264, Jun. 2019, 836 pages.

"Series H: Audiovisual and Multimedia Systems Infrastructure of audiovisual services Coding of moving video; High efficiency video coding," Recommendation ITU-T H.265, Apr. 2013, 317 pages.

"Making Sense of Principal Component Analysis, Eigenvectors & Eigenvalues," https://stats.stackexchange.com/questions/2691/making-sense-of-principal-component-analysis-eigenvectors-eigenvalues, Jun. 12, 2019, 24 pages.

"Information Technology—MPEG-I (Coded Representation of Immersive Media)—Part 9: Geometry-Based Point Could Compression," Working Draft, ISO/IEC 23090-9:2019(E), ISO/IEC JTC 1/SC 29/WG 11, 2019, 76 pages.

"Information Technology—MPEG-I (Coded Representation of Immersive Media)—Part 9: Geometry-Based Point Could Compression," Working Draft, ISO/IEC 23090-9:2020(E), ISO/IEC JTC 1/SC 29/WG 11, 2020, 154 pages.

Ainala, K., et al., "An improved enhancement layer for octree based point cloud compression with plane projection approximation," SPIE Optical Engineering + Applications, 2016, Proc. of SPIE vol. 9971, Applications of Digital Image Processing XXXIX, 99710R, Sep. 27, 2016, 10 pages.

* cited by examiner

HYBRID GEOMETRIC CODING OF POINT CLOUDS

CROSS-REFERENCE TO RELATED APPLICATIONS

This is a continuation of Int'l Patent App. No. PCT/US2019/039031 filed on Jun. 25, 2019, which claims priority to U.S. Prov. Patent App. No. 62/689,666 filed on Jun. 25, 2018, both of which are incorporated by reference.

TECHNICAL FIELD

The disclosed embodiments relate to PCC in general and hybrid geometric coding of point clouds in particular.

BACKGROUND

Point clouds use a relatively large amount of data, so communication of point clouds uses a relatively large amount of bandwidth. However, many networks operate at or near their bandwidth capacities. In addition, customers demand high point cloud quality, which requires using even more data. There is therefore a desire to both reduce the amount of data point clouds use and improve point cloud quality. One solution is to compress point clouds during an encoding process and decompress the point clouds during a decoding process.

SUMMARY

A first aspect relates to an apparatus comprising a processor configured to obtain a point cloud, make a choice between octree encoding or quadtree encoding of a parent node, and encode the parent node into a bitstream based on the choice; and a transmitter coupled to the processor and configured to transmit the bitstream.

In a first implementation form of the apparatus according to the first aspect as such, the octree encoding is 3D.

In a second implement form of the apparatus according to the first aspect as such or any preceding implementation form of the first aspect, the octree encoding uses eight cube child nodes.

In a third implement form of the apparatus according to the first aspect as such or any preceding implementation form of the first aspect, the quadtree encoding is 2D.

In a fourth implement form of the apparatus according to the first aspect as such or any preceding implementation form of the first aspect, the quadtree encoding uses four square child nodes.

In a fifth implement form of the apparatus according to the first aspect as such or any preceding implementation form of the first aspect, the processor is further configured to further make the choice based on a flatness parameter.

In a sixth implement form of the apparatus according to the first aspect as such or any preceding implementation form of the first aspect, the processor is further configured to further make the choice based on a rate distortion.

A second aspect relates to a method comprising obtaining a point cloud; making a choice between octree encoding or quadtree encoding of a parent node; encoding the parent node into a bitstream based on the choice; and transmitting the bitstream.

In a first implementation form of the method according to the second aspect as such, the octree encoding is 3D.

In a second implementation form of the method according to the second aspect as such or any preceding implementation form of the second aspect, the octree encoding uses eight cube child nodes.

In a third implementation form of the method according to the second aspect as such or any preceding implementation form of the second aspect, the quadtree encoding is 2D.

In a fourth implementation form of the method according to the second aspect as such or any preceding implementation form of the second aspect, the quadtree encoding uses four square child nodes.

In a fifth implementation form of the method according to the second aspect as such or any preceding implementation form of the second aspect, the method further making the choice based on a flatness parameter.

In a sixth implementation form of the method according to the second aspect as such or any preceding implementation form of the second aspect, the method further comprises further making the choice based on a rate distortion.

A third aspect relates to an apparatus comprising a receiver configured to receive a bitstream; and a processor coupled to the receiver and configured to parse from the bitstream a first parameter indicating a depth of PCC, decode first nodes before the depth using octree decoding, parse from the bitstream a second parameter indicating a node coding mode for second nodes at and after the depth, and decode the second nodes based on the second parameter.

In a first implementation form of the apparatus according to the third aspect as such, the octree decoding is 3D and uses eight cube child nodes.

In a second implementation form of the apparatus according to the third aspect as such or any preceding implementation form of the third aspect, the quadtree decoding is 2D and uses four square child nodes.

In a third implementation form of the apparatus according to the third aspect as such or any preceding implementation form of the third aspect, the processor is further configured to further decode the first nodes and the second nodes until reaching an LoD.

A fourth aspect relates to a method comprising receiving a bitstream; parsing from the bitstream a first parameter indicating a depth of PCC; decoding first nodes before the depth using octree decoding; parsing from the bitstream a second parameter indicating a node coding mode for second nodes at and after the depth; decoding the second nodes based on the second parameter.

A fifth aspect relates to an apparatus comprising a processing means configured to obtain a point cloud, make a choice between octree encoding or quadtree encoding of a parent node, and encode the parent node into a bitstream based on the choice; and a transmission means coupled to the processing means and configured to transmit the bitstream.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
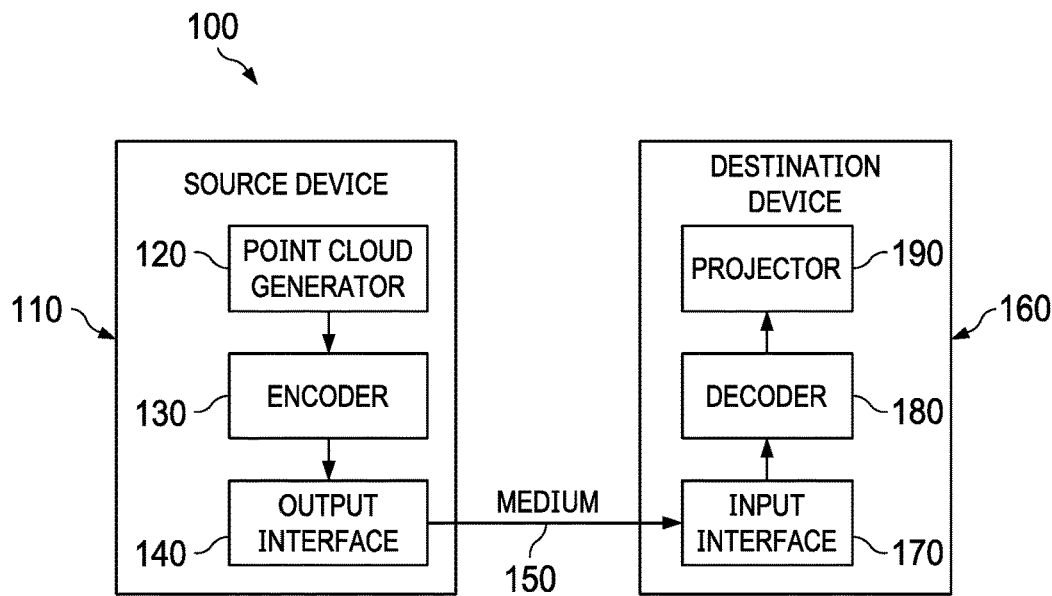
FIG. 1 is a schematic diagram of a coding system.

The following abbreviations apply:

ASIC: application-specific integrated circuit
CPU: central processing unit
DSP: digital signal processor
EO: electrical-to-optical
FPGA: field-programmable gate array
LoD: level of detail
OE: optical-to-electrical
PCC: point cloud coding
RAM: random-access memory
RF: radio frequency
ROM: read-only memory
RX: receiver unit
SRAM: static RAM
TCAM: ternary content-addressable memory
TX: transmitter unit
2D: two-dimensional
3D: three-dimensional FIG. 1 is a schematic diagram of a coding system 100. The coding system 100 comprises a source device 110, a medium 150, and a destination device 160.

The source device 110 comprises a point cloud generator 120, an encoder 130, and an output interface 140. The point cloud generator 120 is a component suitable for generating point clouds. The encoder 130 may be referred to as a codec. The encoder 130 performs encoding according to a set of rules. The output interface 140 is an antenna or another component suitable for transmitting data to the destination device 160. Alternatively, the point cloud generator 120, the encoder 130, and the output interface 140 are in a combination of devices.

The medium 150 is a local network, a radio network, the Internet, or another suitable medium. The medium 150 communicates data between the source device 110 and the destination device 160.

The destination device 160 comprises an input interface 170, a decoder 180, and a projector 190. The input interface 170 is an antenna or another component suitable for receiving data from the source device 110. The decoder 180 may also be referred to as a codec. The decoder 180 performs decoding according to a set of rules. The projector 190 is a component suitable for projecting point clouds. Alternatively, the input interface 170, the decoder 180, and the projector 190 are in a combination of devices.

In operation, in the source device 110, the point cloud generator 120 captures a point cloud, the encoder 130 encodes the point cloud to create an encoded point cloud, and the output interface 140 transmits the encoded point cloud over the medium 150 and towards the destination device 160. The source device 110 may locally store the point cloud or the encoded point cloud, or the source device 110 may instruct storage of the point cloud or the encoded point cloud on another device. In the destination device 160, the input interface 170 receives the encoded point cloud from the source device 110, the decoder 180 decodes the encoded point cloud to obtain a decoded point cloud, and the projector 190 projects the decoded point cloud. The decoder 180 may decode the encoded point cloud in a reverse manner compared to how the encoder 130 encodes the point cloud. The destination device 160 locally stores the encoded point cloud or the decoded point cloud, or the destination device 160 instructs storage of the encoded point cloud or the decoded point cloud on another device.

The point cloud generator 120 may be a lidar, a traditional camera, an infrared camera, a time-of-flight camera, a laser system, a scanner, or another device that scans objects and generates point clouds representing the objects. The objects may be vehicles, so the point clouds may be 3D. The point clouds may comprise hundreds of thousands or millions of points. Thus, the point clouds therefore require significant data to encode and significant bandwidth to communicate. There is therefore a desire to efficiently code, and thus communicate, the point clouds.

The encoder 130 and the decoder 180 perform PCC of the point clouds. PCC includes both attribute coding and geometric coding. Coding includes both encoding and decoding. Attribute coding codes attributes such as color, reflectance, and transparency. Geometric coding codes where in space the points are. Octree coding is one type of geometric coding.

Octree coding starts with a parent node, which is a 3D cube that encompasses all points in a point cloud; divides the parent node into eight child nodes, which are also 3D cubes; and repeats that division until a desired endpoint. At each division, a node being divided is a parent node, and the nodes the parent node is divided into are child nodes. Each parent node is coded with eight bits, where each bit indicates whether a corresponding child node comprises points. Some parent nodes may not have points spread throughout their 3D spaces. Instead, those parent nodes may have points along or substantially along a plane. It is therefore inefficient to divide those parent nodes into eight child nodes.

Disclosed herein are embodiments for hybrid geometric coding of point clouds. In this context, hybrid geometric coding of point clouds comprises both 3D coding and 2D coding, for instance octree coding and quadtree coding. Quadtree coding starts with a parent node, which is a 3D cube; projects points in the parent node onto a 2D plane; and divides the plane into four child nodes, which are 2D squares. The parent node is coded with four bits, where each bit indicates whether a corresponding child node comprises points. Whether to use octree coding or quadtree coding is based on a flatness parameter, rate distortion, or another metric. Though hybrid geometric coding with both octree coding and quadtree coding is discussed, the embodiments apply to other types of coding with different numbers of nodes. In addition, though a flatness parameter and rate distortion are discussed, the embodiments apply to other metrics that make 2D coding more efficient, while preserving an acceptable level of quality.

Figure 2:
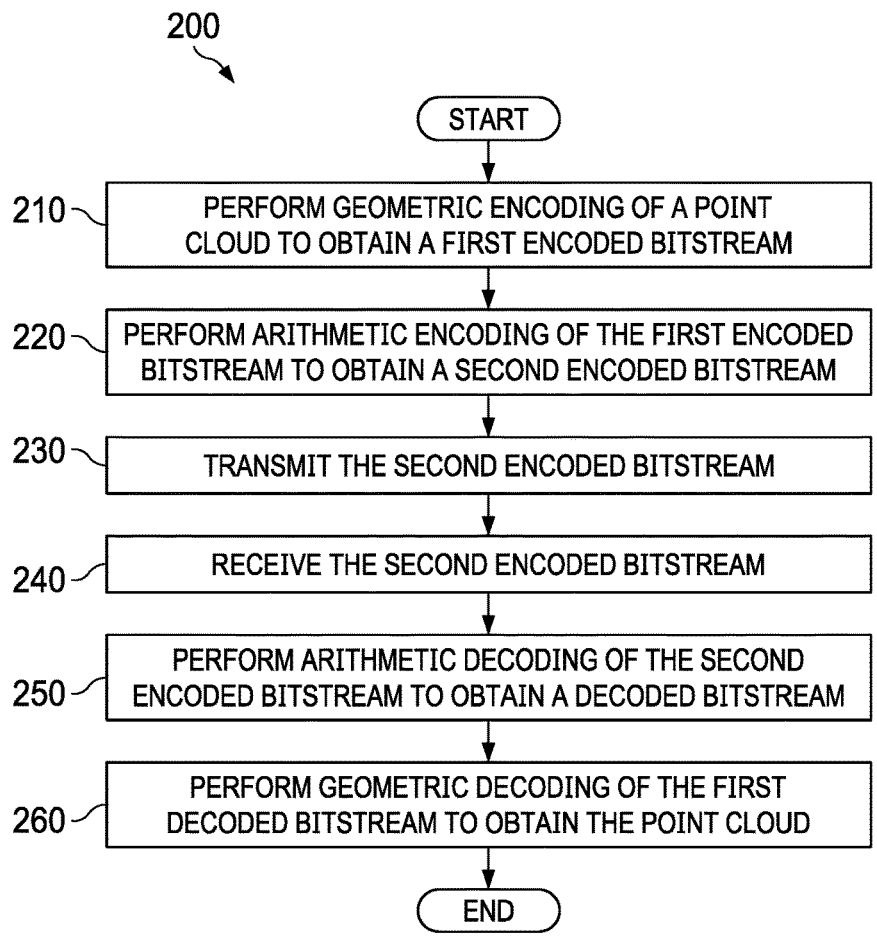
FIG. 2 is a flowchart illustrating a simplified coding method.

FIG. 2 is a flowchart illustrating a simplified coding method 200. The coding system 100 implements the method 200. The simplified coding method 200 demonstrates part of a coding process. Thus, the coding process may include other steps such as attribute coding.

At step 210, the encoder 130 performs geometric encoding of a point cloud to obtain a first encoded bitstream. Step 210 is further described with respect to FIGS. 3 and 5 below. At step 220, the encoder 130 performs arithmetic encoding of the first encoded bitstream to obtain a second encoded bitstream. At step 230, the output interface 140 transmits the second encoded bitstream.

At step 240, the input interface 170 receives the second encoded bitstream. At step 250, the decoder 180 performs arithmetic decoding of the second encoded bitstream to obtain a decoded bitstream. Finally, at step 260, the decoder 180 performs geometric decoding of the first decoded bitstream to obtain the point cloud. Step 260 is further described with respect to FIG. 6 below.

Figure 3:
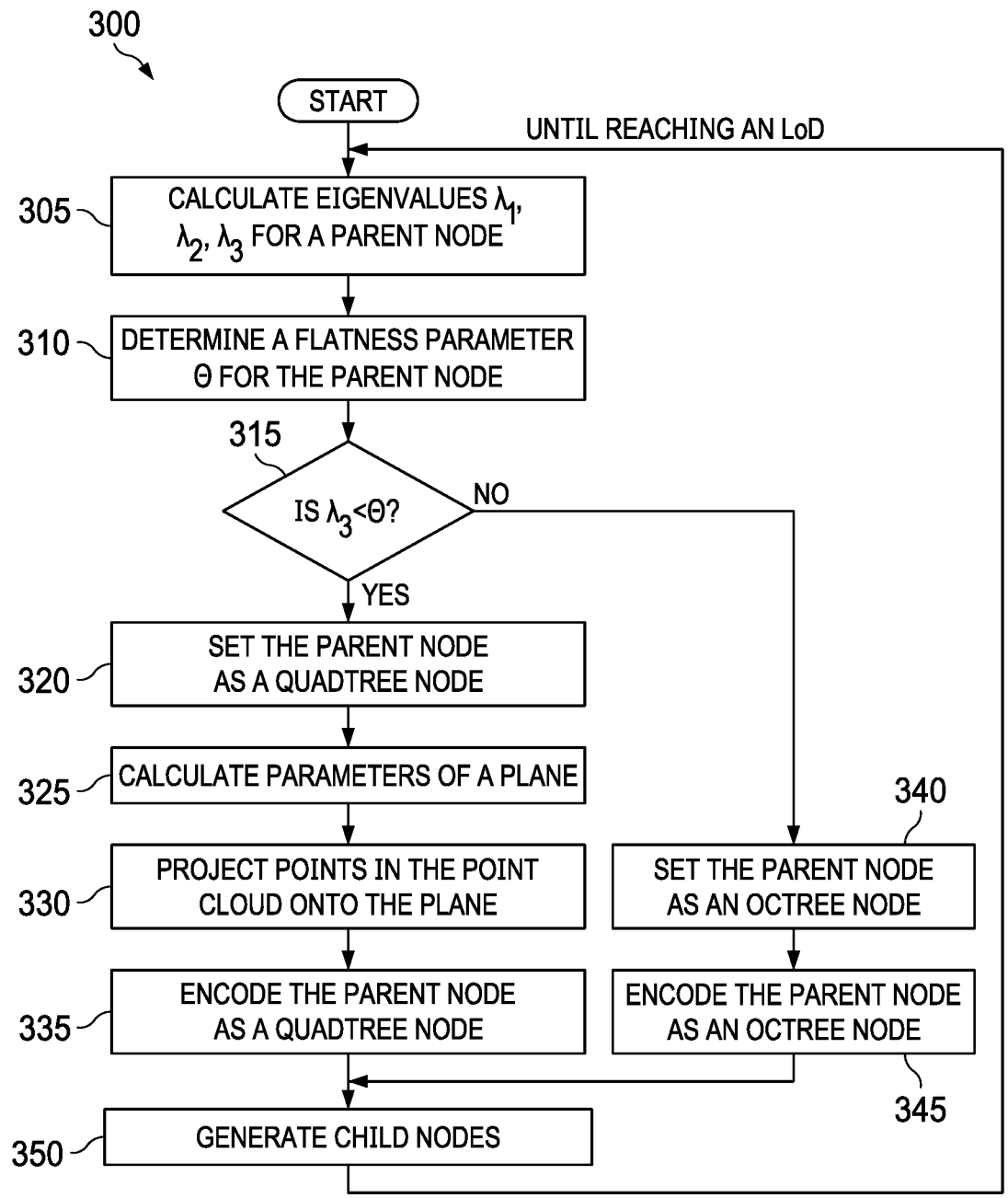
FIG. 3 is a flowchart illustrating a method of hybrid geometric encoding based on a flatness constraint according to an embodiment of the disclosure.

FIG. 3 is a flowchart illustrating a method 300 of hybrid geometric encoding based on a flatness constraint according to an embodiment of the disclosure. The method 300 may implement step 210 in FIG. 2. At step 305, the encoder 130 calculates eigenvalues $\lambda_1, \lambda_2, \lambda_3$ for a parent node. $\lambda_1, \lambda_2, \lambda_3$ form an orthogonal basis (x', y', z'), which are three orthogonal axes. (x', y', z') are rotated with respect to a global coordinate system (x, y, z). Angles between (x, y, z) and (x', y', z') are $R_x, R_y,$ and $R_z$. At step 310, the encoder 130 calculates a flatness parameter $\Theta$ for the parent node. Assuming $\lambda_3$ is the smallest from among $\lambda_1, \lambda_2, \lambda_3, \Theta$ is as follows:

$$\Theta = \frac{\lambda_3}{\lambda_1 + \lambda_2 + \lambda_3}. \tag{1}$$

At decision 315, the encoder 130 determines whether $\lambda_3 < \Theta$. If so, then the parent node has points along or substantially along a plane, and the method 300 proceeds to step 320. If not, then the parent node does not have points along or substantially along a plane, and the method 300 proceeds to step 340.

Figure 4A:
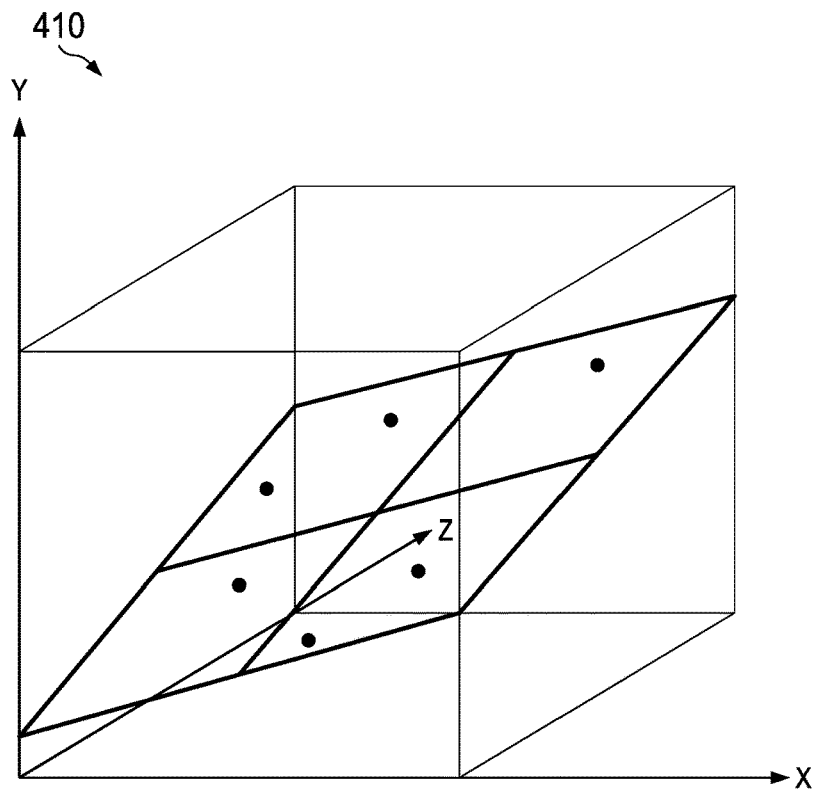
FIG. 4A is a schematic diagram of a parent node that has points along or substantially along a plane.
Figure 4B:
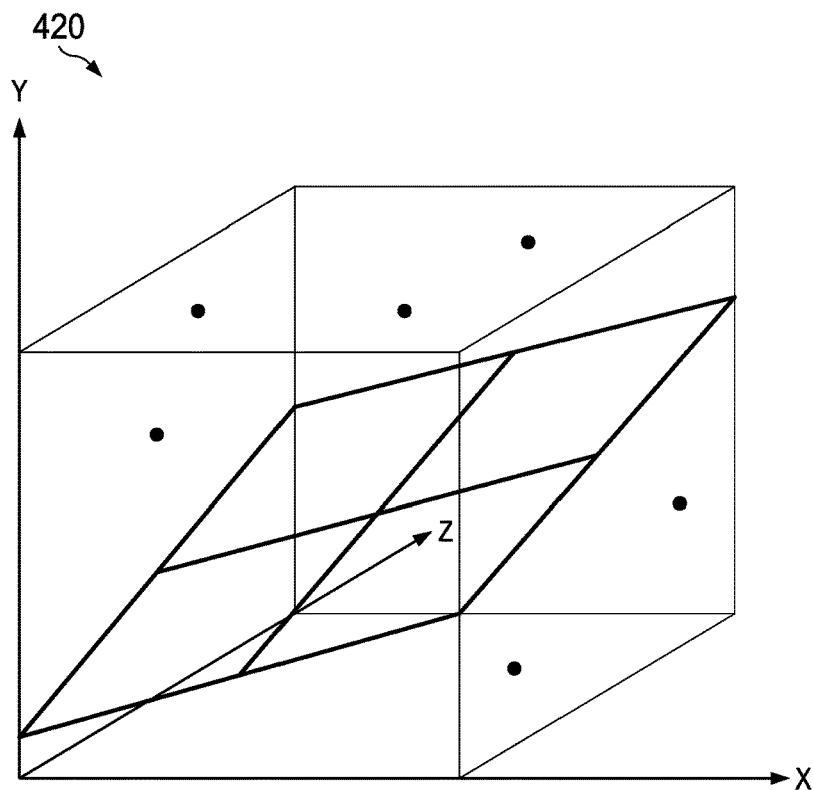
FIG. 4B is a schematic diagram of a parent node that does not have points along or substantially along a plane.

FIG. 4A is a schematic diagram of a parent node 410 that has points along or substantially along a plane. Thus, the method 300 would proceed to step 320 for the parent node 410. FIG. 4B is a schematic diagram of a parent node 420 that does not have points along or substantially along a plane. Thus, the method 300 would proceed to step 340 for the parent node 420.

Returning to FIG. 3, at step 320, the encoder 130 sets the parent node as a quadtree node. For instance, the encoder 130 encodes node_coding_mode=1. At step 325, the encoder 130 calculates parameters of a plane. Specifically, the encoder 130 determines an eigenvector corresponding to $\lambda_3$; a normal vector n corresponding to the eigenvector; a normal vector n' corresponding to the parent node; and compares n to n' to obtain angle θ for the x-direction, angle φ for the y-direction, and angle Ψ for the z-direction. Using θ, φ, and Ψ, the encoder 130 calculates a rotation set ($R_x, R_y, R_z$) with the following components:

$$R_x = \begin{pmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{pmatrix} \tag{2}$$

$$R_y = \begin{pmatrix} 1 & 0 & 0 & 0 \\ 0 & \cos\varphi & -\sin\varphi & 0 \\ 0 & \sin\varphi & \cos\varphi & 0 \\ 0 & 0 & 0 & 1 \end{pmatrix}$$

$$R_z = \begin{pmatrix} \cos\psi & 0 & \sin\psi & 0 \\ 0 & 1 & 0 & 0 \\ -\sin\psi & 0 & \cos\psi & 0 \\ 0 & 0 & 0 & 1 \end{pmatrix}.$$

Using centroid translation components $t_x, t_y,$ and $t_z$, the encoder 130 calculates a translation matrix T as follows:

$$T = \begin{pmatrix} 1 & 0 & 0 & t_x \\ 0 & 1 & 0 & t_y \\ 0 & 0 & 1 & t_z \\ 0 & 0 & 0 & 1 \end{pmatrix}. \tag{3}$$

T shifts an origin from a center of the parent node to a center of the plane. The encoder 130 further calculates a size of a side of the plane as $2^m$, where m=QTNodeSizeLog2 is based on scale_projection and NodeSizeLog2 of a parent point cloud as follows:

QTNodeSizeLog2=NodeSizeLog2 or

QTNodeSizeLog2=NodeSizeLog2−1. (4)

At step 330, the encoder 130 projects points in the point cloud onto the plane. Specifically, the encoder 130 projects the points from a 3D (x, y, z) coordinate system to a 2D (u, v) coordinate system using ($R_x, R_y, R_z$) and T. At step 335, the encoder 130 encodes the parent node as a quadtree node.

As a first alternative for projecting the points onto the plane, the encoder 130 uses a projection axis index and a distance after applying rotation. In that case, the encoder 130 may apply only three rotations to the points. As a second alternative for projecting the points onto the plane, the encoder 130 uses an oblique projection without rotation to one of the child node surfaces. In that case, the encoder 130 encodes a normal vector n (x, y, z), a distance d to a centroid of the plane, and a projection plane index. For instance, the projection plane index is 00 for xy, 01 for xz, and 10 for yz. The projection plane may be a plane with a minimum size of the projected normal as follows:

min {$n_{xy}(x, y, 0), n_{yz}(0, y, z), n_{xz}(x, 0, z)$}. (5)

If a normal projection size is 0, then the plane is parallel to a corresponding coordinate plane, so the encoder 130 may encode only the distance and the projection plane index. Thus, if the normal vector is absent, then the plane is parallel to the corresponding coordinate plane.

At step 340, the encoder 130 sets the parent node as an octree node. At step 345, the encoder 130 encodes the parent node as an octree node. Finally, at step 350, the encoder 130 generates child nodes. When the parent node is a quadtree node, the encoder 130 calculates central points of the child nodes as follows:

$$\text{Child}QT\text{NodeSizeLog2}=QT\text{NodeSizeLog2}-1. \quad (6)$$

When the parent node is an octree node, the encoder 130 calculates central points of the child nodes using standard octree encoding.

The encoder 130 repeats the method 300 until it reaches an LoD, which indicates a predefined maximum number of node divisions, or splits. Once the encoder 130 sets a parent node as a quadtree node, the encoder 130 then encodes each subsequent child node, grandchild node, and so on as a quadtree node until the method 300 reaches the LoD.

To reduce signaling, the encoder 130 may assume octree encoding and perform the method 300 beginning at a depth indicated by minQuadTreeDepth, indicated by maxQuadTreeSizeLog2, or at which a number of points in the parent node is below a threshold. The encoder 130 may encode minQuadTreeDepth or maxQuadTreeSizeLog2. A depth indicates a number of node splits. If minQuadTreeDepth=0, then no quadtree coding is used. The encoder 130 may signal minQuadTreeDepth or maxQuadTreeSizeLog2.

Figure 5:
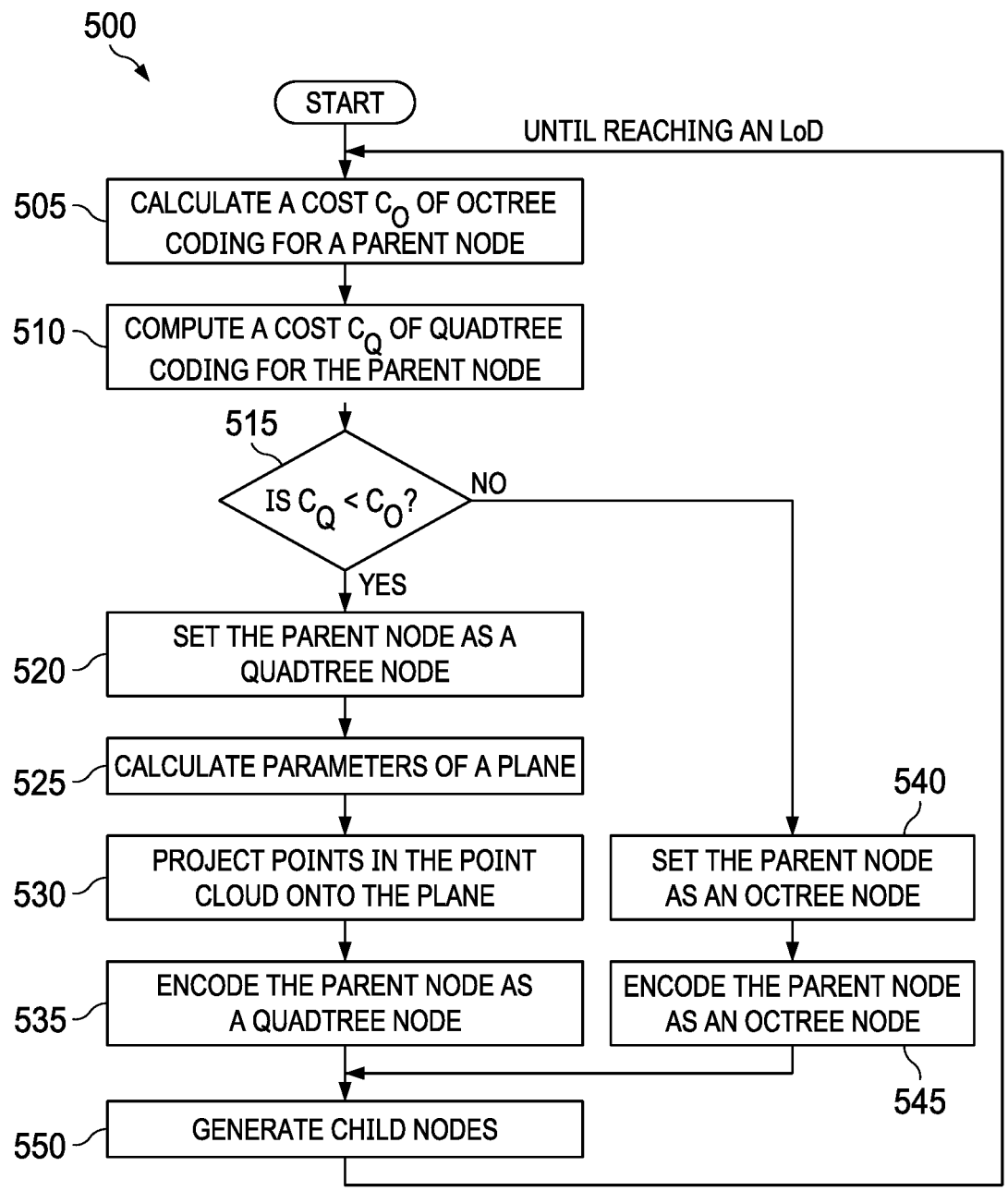
FIG. 5 is a flowchart illustrating a method of hybrid geometric encoding based on a cost according to an embodiment of the disclosure.

FIG. 5 is a flowchart illustrating a method 500 of hybrid geometric encoding based on a cost according to an embodiment of the disclosure. The method 500 may implement step 210 in FIG. 2. At step 505, the encoder 130 computes a cost $C_O$ of octree coding for a parent node. At step 510, the encoder 130 computes a cost $C_Q$ of quadtree coding for the parent node. The costs $C_O$, $C_Q$ indicate rate distortion, flatness of points in the point cloud, or another metric. At decision 515, the encoder 130 determines whether $C_Q<C_O$. If so, then quadtree coding has a sufficiently low cost, and the method 500 proceeds to step 520. If not, then quadtree coding does not have a sufficiently low cost, and the method 500 proceeds to step 540. To reduce signaling, the encoder 130 may assume octree encoding and perform the method 500 beginning at a depth indicated by minQuadTreeDepth, indicated by maxQuadTreeSizeLog2, or at which a number of points in the parent node is below a threshold. The encoder 130 may signal minQuadTreeDepth or maxQuadTreeSizeLog2. Steps 520-550 are similar to steps 320-350 in FIG. 3.

The encoder 130 repeats the method 500 until it reaches an LoD. Once the encoder 130 sets a parent node as a quadtree node, the encoder 130 then encodes each subsequent child node, grandchild node, and so on as a quadtree node until the method 300 reaches the LoD.

To further implement step 210 in FIG. 2, which is described further in the method 300 in FIG. 3 and the method 500 in FIG. 5, the encoder 130 may encode the following syntax as geometry bitstream syntax:

TABLE 1

Geometry Bitstream Syntax

| | Descriptor |
|---|---|
| geometry_bitstream ( ) { | |
|     bitstream_size_in_bytes | u(32) |
|     minQuadTreeDepth | ae(v) |
|     for( depth = 0; depth < MaxGeometryCodeTreeDepth; depth++ ) { | |
|         for( nodeIdx = 0; nodeIdx < NumNodesAtDepth[ depth ]; nodeIdx++ ) | |
| { | |
|         xN = NodeX[ depth ][ nodeIdx ] | |
|         yN = NodeY[ depth ][ nodeIdx ] | |
|         zN = NodeZ[ depth ][ nodeIdx ] | |
|         geometry_node( depth, nodeIdx, xN, yN, zN ) | |
|         } | |
|     } | |
| } | | bitstream_size_in bytes specifies a compressed geometry bitstream size in bytes. minQuadTreeDepth specifies a minimum depth for quadtree decomposition in a current point cloud. When minQaudTreeDepth=0, the bitstream does not contain quadtree nodes. When minQaudTreeDepth is undefined, it is 0.

GeometryNodeOccupancyCnt [depth ][xN][yN][zN] represents a number of child nodes present in an octree node at position (xN, yN, zN) at a given depth. Undefined values of GeometryNodeOccupancyCnt are treated as 0. It is initialized as GeometryNodeOccupancyCnt [−1][0][0][0]0=8.

NodeX [depth][nodeIdx], NodeY [depth][nodeIdx], and NodeZ [depth][nodeIdx] represent x, y, and z coordinates of the idx-th node in decoding order at the given depth. They are initialized as NodeX [0]=NodeY [0]=NodeZ [0]=0. NumNodesAtDepth [depth] represents the number of nodes to be decoded at the given depth. It is initialized as NumNodesAtDepth[0]=1.

In addition, the encoder 130 may encode the following syntax as geometry node syntax:

TABLE 2

Geometry Node Syntax

|  | Descriptor |
|---|---|
| geometry_node ( depth, nodeIdx, xN, yN, zN ) { | |
|   if( neighbour_contexts_enabled_flag && NeighbourPattern = = 0 ) { | |
|     single_occupancy_flag | ae(v) |
|     if( single_occupancy_flag ) | |
|       occupancy_idx | ae(v) |
|   } | |
|   if( !single_occupancy_flag ) | |
|     if (minQuadTreeDepth != 0) { | |
|       node_coding_mode | ae(v) |
|       /* NB: splitting of the current node is described in semantics */ | |
|       if(node_coding_mode = = quadTree) | |
|       { | |
|         occupancy_map // for QT contains 4 elements | ae(v) |
|         if(is_parent_qudtree != 1){ | |
|           projection_rot_x | ae(v) |
|           projection_rot_y | ae(v) |
|           projection_rot_z | ae(v) |
|           mean_value_x | ae(v) |
|           mean_value_y | ae(v) |
|           mean_value_z | ae(v) |
|           scale_projection | ae(v) |
|         } | |
|         ... | |
|       }else{ // octreeCodingMode | |
|     } | |
|         occupancy_map // for OT contains 8 elements | ae(v) |
|     if( depth = = MaxGeometryOctreeDepth − 1 ) // [NB ie NodeSize = 2] | |
|       if( !unique_geometry_points_flag ) | |
|         for( child = 0; child < GeometryNodeChildrenCnt; child++ ) { | |
|           num_points_eq1_flag [Ed(df): _gt1_flag?] | ae(v) |
|           if( !num_points_eq1_flag) | |
|             num_points_minus2 | ae(v) |
|         } | |
|   } else { | |
|     if( DirectModeFlagPresent ) | |
|       direct_mode_flag | ae(v) |
|     if( direct_mode_flag ) { | |
|       num_direct_points_minus1 | ae(v) |
|       for( I = 0; I <= num_direct_points_minus1; i++ ) | |
|         for( j = 0; j < ChildNodeSizeLog2; j++ ) { | |
|           point_rem_x[ I ][ j ] | ae(v) |
|           point_rem_y[ I ][ j ] | ae(v) |
|           point_rem_z[ I ][ j ] | ae(v) |
|         } | |
|     } | |
|   } | |
| } | |

Nodes at depth MaxGeometryCodeTreeDepth are the last child nodes, which may be referred to as leaf nodes. For quadtree coding, a position of a node is given by the coordinate of its lower-left corner position as (uN, vN). uPn and yvn indicate a position of the node's parent node as follows:

$$uPn = uN \gg 1$$

$$vPn = vN \gg 1. \qquad (7)$$

For octree coding, a position of a node is given by the coordinate of its lower-left corner position as (xN, yN, zN). xPn, yPn, and zPn indicate a position of the node's parent node as follows:

$$xPn = xN \gg 1$$

$$yPn = yN \gg 1$$

$$zPn = zN \gg 1. \qquad (8)$$

NodeSizeLog2 is derived as follows: NodeSizeLog2 = MaxGeometryOctreeDepth−depth. ChildNodeSizeLog2 is derived as follows: ChildNodeSizeLog2=NodeSizeLog2−1. NeighbourPattern is derived as follows:

NeighbourPattern=

((GeometryNodeOccupancyCnt[depth−1][xPn+1] [yPn][zPn] !=0)≪0)

((GeometryNodeOccupancyCnt[depth−1][xPn−1] [yPn][zPn]!=0)≪1)

((GeometryNodeOccupancyCnt[depth−1][xPn][yPn− 1][zPn] !=0)≪2)

((GeometryNodeOccupancyCnt[depth−1][xPn][yPn+ 1][zPn] !=0)≪3)

((GeometryNodeOccupancyCnt[depth−1][xPn][yPn] [zPn−1] !=0)≪4)

((GeometryNodeOccupancyCnt[depth 1][xPn][yPn] [zPn+1] !=0)≪5).

For quadtree coding, a neighboring pattern is assumed as an empty node. single_occupancy_flag=1 indicates that the node contains a single child node. single_occupancy_flag=0 indicates that the node may contain multiple child nodes. occupancy_idx identifies a single child node that is present in a parent node. When present, OccupancyMap is set equal to 1«occupancy_idx. occupancy_map is a bitmap that identifies the child nodes present in the parent node. When present, OccupancyMap is set equal to the output of the geometry occupancy map permutation process when invoked with NeighbourPattern and occupancy_map as inputs. For quadtree coding, occupancy map has a maximum of four input elements. For octree coding, occupancy_map has a maximum of eight input elements. The array GeometryNodeChildren [i] identifies an index of an i-th occupied child node of a parent node. GeometryNodeChildrenCnt identifies a number of child nodes in an array GeometryNodeChildren [ ]. For octree coding, a parent node may have one to eight children. For quadtree coding, a parent node may have one to four children.

When either occupancy_ idx or occupancy_map is present, the following applies:

```
childCnt = 0;
    for( childIdx = 0; childIdx < 8; childIdx++) {
        if( !( OccupancyMap & ( 1 << childIdx ) ) )
            continue;
        GeometryNodeChildren[ childCnt++ ] = childIdx;
    }
    GeometryNodeChildrenCnt = childCnt;
    GeometryNodeOccupancyCnt[ depth ][ xN ][ yN ][ zN ] = childCnt;
```

DirectModeFlagPresent is derived as follows:

When all of the following conditions are true, DirectModeFlagPresent=1:

inferred_direct_coding_mode_enabled_flag=1
NodeSizeLog2>1

GeometryNodeOccupancyCnt [depth−1][$xPn$][$yPn$] [$zPn$]≤2

GeometryNodeOccupancyCnt [depth][$xN$][$yN$][$zN$]=1

Otherwise, DirectModeFlagPresent=0.

num_points_eq_1_flag=1 indicates that a current child node contains a single point. num_points_eq_1_flag=0 indicates that a child node contains at least two points. When not present, it is inferred that num_points_eq_1_flag is inferred=1. num_points_minus2 indicates a number of points represented by a child node. direct_mode_flag=1 indicates that a single child node of a parent node is a leaf node and contains one or more delta point coordinates. direct_mode_flag=0 indicates that a single child node of a parent node is an octree node. When not present, it is inferred that direct_mode_flag=0.

When direct_mode_flag is equal to 1, the following applies: GeometryNodeOccupancyCnt [depth][xN][yN][zN]=0. When direct_mode_flag is equal to 0, the following applies:

```
nodeIdx = NumNodesAtDepth[ depth + 1 ];
for( child = 0; child < GeometryNodeChildrenCnt; child++ ) {
    childIdx = GeometryNodeChildren[ child ];
    NodeX[ depth + 1 ][ nodeIdx ] = 2 × xN + ( childIdx & 4 == 1 );
    NodeY[ depth + 1 ][ nodeIdx ] = 2 × yN + ( childIdx & 2 == 1 );
    NodeZ[ depth + 1 ][ nodeIdx ] = 2 × zN + ( childIdx & 1 == 1 );
    nodeIdx++;
}
NumNodesAtDepth[ depth + 1 ] = nodeIdx;.
``` num direct_points_minus1 indicates a number of points in a child node. point_rem_x [i][j], point_rem_y[i][j], and point_rem_z [i][j] indicate the j-th bit of the current child node's i-th point's respective x, y, and z co-ordinates relative to the origin of the child node identified by the index GeometryNodeChildren [0].

Figure 6:
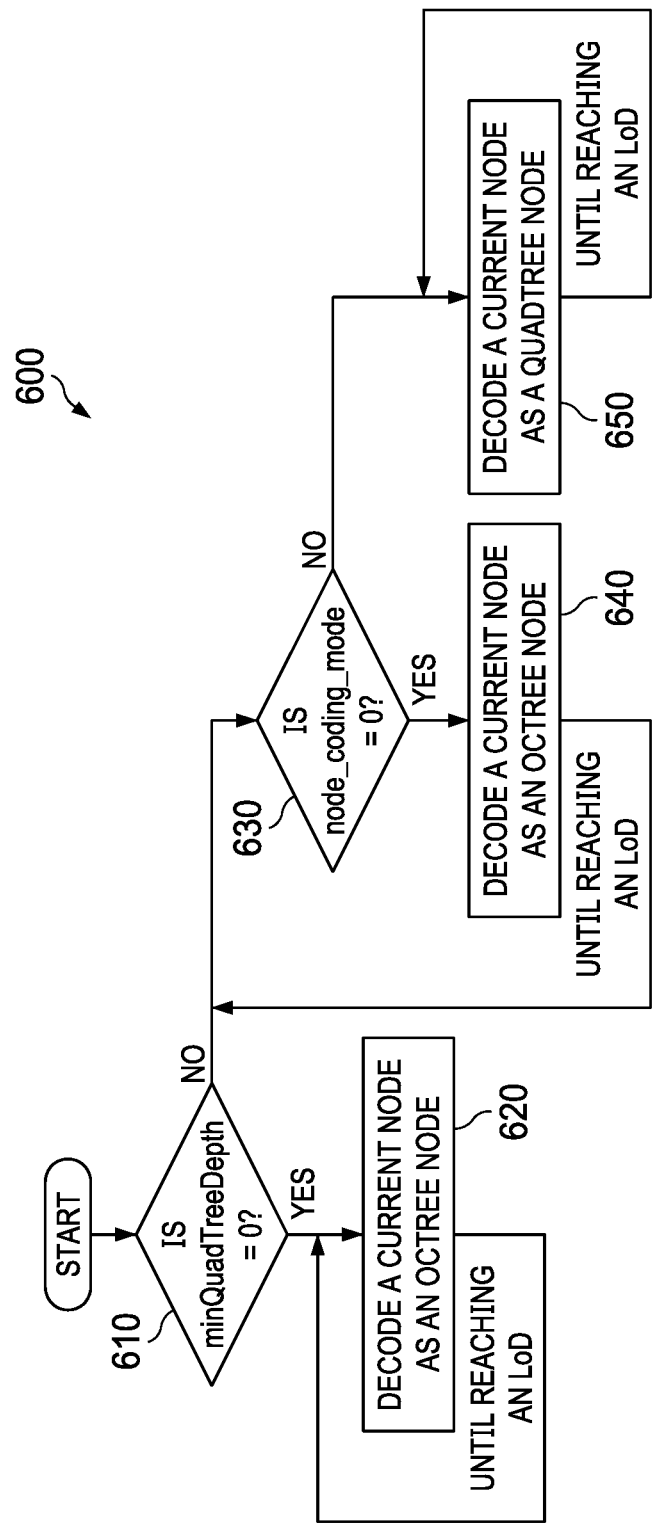
FIG. 6 is a method of hybrid geometric decoding according to an embodiment of the disclosure.

FIG. 6 is a method 600 of hybrid geometric decoding according to an embodiment of the disclosure. The method 600 may implement step 260 in FIG. 2. At decision 610, the decoder 180 determines whether minQuadTreeDepth=0. If so, then the method 600 proceeds to step 620. If not, then the method 600 proceeds to decision 630. Alternatively, the decoder 180 may proceed to step 620 once it reaches a depth at which a number of points in the parent node is below a threshold. At step 620, the decoder 180 decodes a current node as an octree node. The decoder 180 repeats step 620 until it reaches an LoD.

At decision 630, the decoder 180 determines whether node_coding_mode=0. If so, then the method 600 proceeds to step 640. If not, then the method proceeds to step 650. At step 640, the decoder 180 decodes a current node as an octree node. Also, if the current node is an octree node and has a parent node that is also an octree node, then the decoder 180 may read no additional information from the bitstream. At step 650, the decoder 180 decodes a current node as a quadtree node. If the current node is a quadtree node and has a parent node that is an octree node, then the decoder 180 reads from the bitstream a scale parameter, offset parameters (mean_value_x, mean_value_y, mean_value_z), and normal parameters (projection_rot_x, projection_rot_y, projection_rot_z), and the decoder 180 applies an inverse scale parameter (scale_projection) to project points onto a plane. If the current node is a quadtree node and has a parent node that is also a quadtree node, then the decoder 180 reads from the bitstream a scale parameter, offset parameters (mean_value_x, mean_value_y, mean_value_z), and normal parameters (projection_rot_x, projectio_rot_ y, projection_rot_z) inherited from the parent node, and the decoder 180 applies an inverse scale parameter (scale_projection) to project points onto a plane. The decoder 180 repeats decision 630 for step 640 and repeats steps 640-650 until it reaches an LoD.

Figure 7:
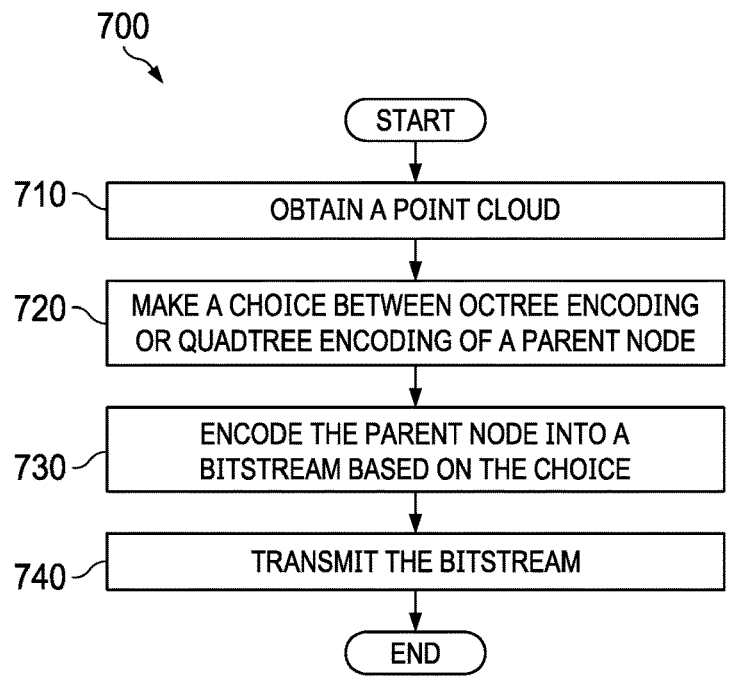
FIG. 7 is a flowchart illustrating a method of hybrid geometric encoding according to an embodiment of the disclosure.

FIG. 7 is a flowchart illustrating a method 700 of hybrid geometric encoding according to an embodiment of the disclosure. The source device 110 implements the method 700. At step 710, a point cloud is obtained. For instance, the point cloud generator 120 records a point cloud. At step 720, a choice between octree encoding or quadtree encoding of a parent node is made. For instance, the encoder 130 makes the decision 315 in FIG. 3 or the decision 515 in FIG. 5. At step 730, the parent node is encoded into a bitstream based on the choice. For instance, the encoder 130 performs step 335 or step 345 in FIG. 3 or performs step 535 or step 545 in FIG. 5. Finally, at step 740, the bitstream is transmitted. For instance, the output interface 140 transmits the bitstream to the destination device 160 through the medium 150.

Figure 8:
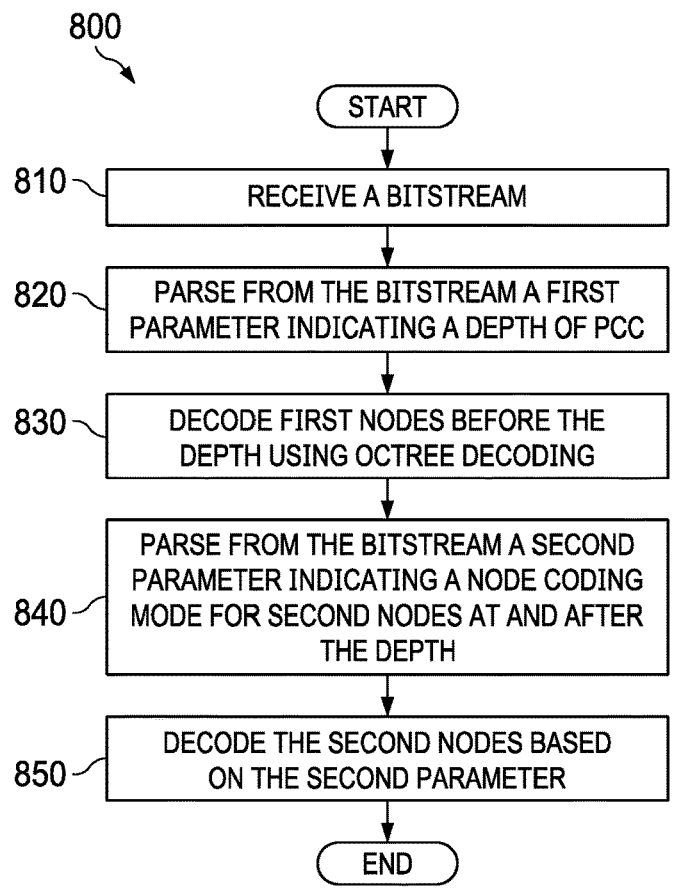
FIG. 8 is a flowchart illustrating a method of hybrid geometric decoding according to an embodiment of the disclosure.

FIG. 8 is a flowchart illustrating a method 800 of hybrid geometric decoding according to an embodiment of the disclosure. The destination device 160 implements the method 800. At step 810, a bitstream is received. For instance, the input interface 170 receives the bitstream from the source device 110. At step 820, a first parameter indicating a depth of PCC is parsed from the bitstream. For instance, the decoder 180 parses minQuadTreeDepth from the bitstream. At step 830, first nodes before the depth are decoded using octree decoding. For instance, the decoder 180 performs step 620 after a yes result from decision 610 in FIG. 6. At step 840, a second parameter indicating a node coding mode for second nodes at and after the depth is parsed from the bitstream. For instance, the decoder 180 parses node_coding_mode from the bitstream. Finally, at step 850, the second nodes are decoded based on the second parameter. For instance, the decoder 180 performs step 640 or step 650 in FIG. 6.

Figure 9:
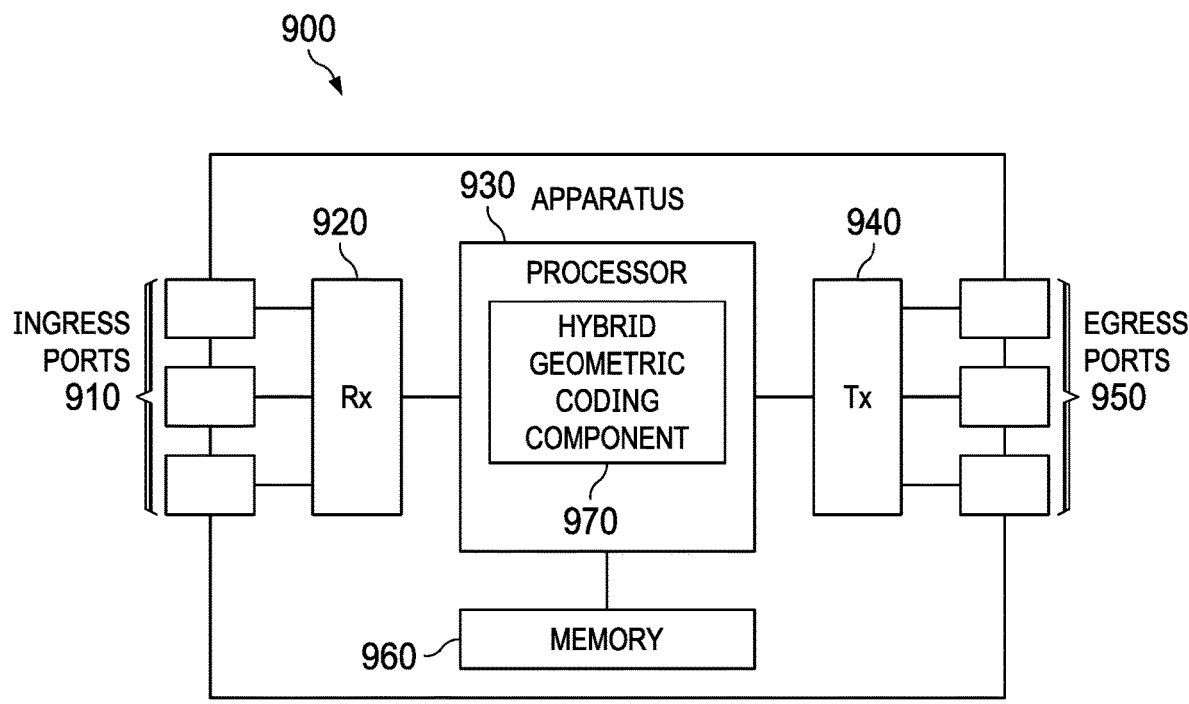
FIG. 9 is a schematic diagram of an apparatus according to an embodiment of the disclosure.

FIG. 9 is a schematic diagram of an apparatus 900 according to an embodiment of the disclosure. The apparatus 900 may implement the disclosed embodiments. The apparatus 900 comprises ingress ports 910 and an RX 920 to receive data; a processor, logic unit, baseband unit, or CPU 930 to process the data; a TX 940 and egress ports 950 to transmit the data; and a memory 960 to store the data. The apparatus 900 may also comprise OE components, EO components, or RF components coupled to the ingress ports 910, the RX 920, the TX 940, and the egress ports 950 to provide ingress or egress of optical signals, electrical signals, or RF signals.

The processor 930 is any combination of hardware, middleware, firmware, or software. The processor 930 comprises any combination of one or more CPU chips, cores, FPGAs, ASICs, or DSPs. The processor 930 communicates with the ingress ports 910, the RX 920, the TX 940, the egress ports 950, and the memory 960. The processor 930 comprises a hybrid geometric coding component 970, which implements the disclosed embodiments. The inclusion of the hybrid geometric coding component 970 therefore provides a substantial improvement to the functionality of the apparatus 900 and effects a transformation of the apparatus 900 to a different state. Alternatively, the memory 960 stores the hybrid geometric coding component 970 as instructions, and the processor 930 executes those instructions.

The memory 960 comprises any combination of disks, tape drives, or solid-state drives. The apparatus 900 may use the memory 960 as an over-flow data storage device to store programs when the apparatus 900 selects those programs for execution and to store instructions and data that the apparatus 900 reads during execution of those programs, for instance as a computer program product. The memory 960 may be volatile or non-volatile and may be any combination of ROM, RAM, TCAM, or SRAM.

A computer program product may comprise computer-executable instructions stored on a non-transitory medium, for instance the memory 960, that when executed by a processor, for instance the processor 930, cause an apparatus to perform any of the embodiments.

Figure 10:
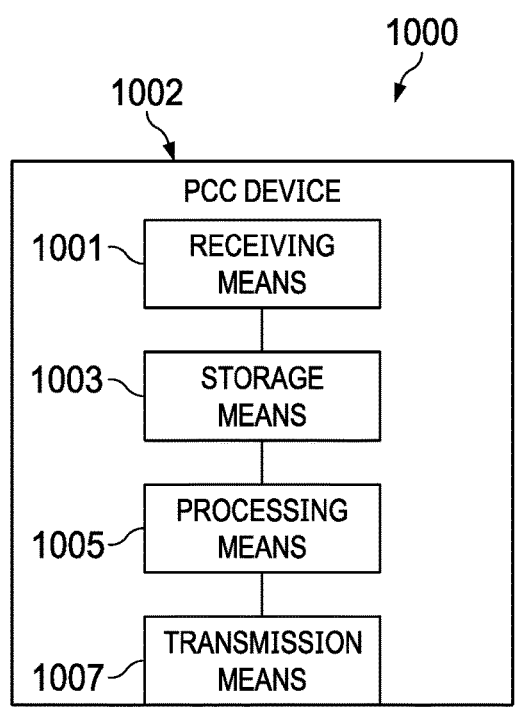
FIG. 10 is a schematic diagram of a means for coding.

FIG. 10 is a schematic diagram of a means for coding 1000. In an embodiment, the means for coding 1000 is implemented in a PCC device 1002 (e.g., the encoder 130 or the decoder 180). The PCC device 1002 includes a receiving means 1001. The receiving means 1001 is configured to receive a picture to encode or to receive a bitstream to decode. The PCC device 1002 includes a transmission means 1007 coupled to the receiving means 1001. The transmission means 1007 is configured to transmit the bitstream to a decoder or to transmit a decoded image to a display means.

The PCC device 1002 includes a storage means 1003. The storage means 1003 is coupled to at least one of the receiving means 1001 or the transmission means 1007. The storage means 1003 is configured to store instructions. The PCC device 1002 also includes processing means 1005. The processing means 1005 is coupled to the storage means 1003. The processing means 1005 is configured to execute the instructions stored in the storage means 1003 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a point cloud compression (PCC) decoder and comprising:
   receiving a point cloud bitstream;
   parsing a first parameter indicating a depth of PCC, wherein the depth indicates a number of node splits;
   decoding first nodes before the depth using non-planar decoding;
   parsing from the point cloud bitstream a second parameter indicating a node coding mode for second nodes at and after the depth; and
   decoding the second nodes based on the second parameter.

2. The method of claim 1, wherein the node coding mode indicates planar decoding, and wherein the method further comprises further decoding the second nodes using the planar decoding.

3. The method of claim 2, wherein the node coding mode further indicates the planar decoding with a non-zero value.

4. The method of claim 2, wherein the planar decoding is quadtree decoding.

5. The method of claim 4, wherein the quadtree decoding is two-dimensional (2D).

6. The method of claim 1, wherein the node coding mode indicates the non-planar decoding, and wherein the method further comprises further decoding the second nodes using the non-planar decoding.

7. The method of claim 6, wherein the node coding mode further indicates the non-planar decoding with a zero value.

8. The method of claim 1, wherein the non-planar decoding is octree decoding.

9. The method of claim 8, wherein the octree decoding is three-dimensional (3D).

10. A point cloud compression (PCC) decoder comprising:
    a receiver configured to receive a point cloud bitstream; and
    a processor coupled to the receiver and configured to:
        parse a first parameter indicating a depth of PCC, wherein the depth indicates a number of node splits;
        decode first nodes before the depth using non-planar decoding;
        parse from the point cloud bitstream a second parameter indicating a node coding mode for second nodes at and after the depth; and decode the second nodes based on the second parameter.

11. The PCC decoder of claim 10, wherein the non-planar decoding is octree decoding.

12. The PCC decoder of claim 11, wherein the octree decoding is three-dimensional (3D).

13. The PCC decoder of claim 10, wherein the node coding mode indicates the non-planar decoding, and wherein the processor is further configured to further decode the second nodes using the non-planar decoding.

14. The PCC decoder of claim 13, wherein the node coding mode further indicates the non-planar decoding with a zero value.

15. The PCC decoder of claim 10, wherein the node coding mode indicates planar decoding, and wherein the processor is further configured to further decode the second nodes using the planar decoding.

16. The PCC decoder of claim 15, wherein the node coding mode further indicates the planar decoding with a non-zero value.

17. The PCC decoder of claim 15, wherein the planar decoding is quadtree decoding.

18. The PCC decoder of claim 17, wherein the quadtree decoding is two-dimensional (2D).

19. A computer program product comprising instructions that are stored on a non-transitory computer-readable medium and that, when executed by a processor, cause a point cloud compression (PCC) decoder to:
receive a point cloud bitstream;
parse a first parameter indicating a depth of PCC, wherein the depth indicates a number of node splits;
decode first nodes before the depth using non-planar decoding;
parse from the point cloud bitstream a second parameter indicating a node coding mode for second nodes at and after the depth; and
decode the second nodes based on the second parameter.

20. The computer program product of claim 19, wherein the non-planar decoding is octree decoding.

21. The computer program product of claim 20, wherein the octree decoding is three-dimensional (3D).

22. The computer program product of claim 19, wherein the node coding mode indicates the non-planar decoding, and wherein the instructions, when executed by the processor, further cause the PCC decoder to further decode the second nodes using the non-planar decoding.

23. The computer program product of claim 22, wherein the node coding mode further indicates the non-planar decoding with a zero value.

24. The computer program product of claim 19, wherein the node coding mode indicates planar decoding, and wherein the instructions, when executed by the processor, further cause the PCC decoder to further decode the second nodes using the planar decoding.

25. The computer program product of claim 24, wherein the planar decoding is quadtree decoding.

26. The computer program product of claim 25, wherein the quadtree decoding is two-dimensional (2D).

27. The computer program product of claim 24, wherein the node coding mode further indicates the planar decoding with a non-zero value.

* * * * *